United States Patent [19]

Iida et al.

[11] Patent Number: 5,900,127
[45] Date of Patent: May 4, 1999

[54] ELECTRODE FOR ELECTROLYSIS AND ELECTROLYTIC CELL USING THE ELECTRODE

[75] Inventors: Masamori Iida, Tokyo; Yoshinori Nishiki, Kanagawa; Takayuki Shimamune, Tokyo; Setsuro Ogata, Kanagawa; Masashi Tanaka, Kanagawa; Shuhei Wakita, Kanagawa; Shun Takahashi, Kanagawa, all of Japan

[73] Assignee: Permelec Electrode Ltd., Kanagawa, Japan

[21] Appl. No.: 08/825,866

[22] Filed: Apr. 2, 1997

[30] Foreign Application Priority Data

Apr. 2, 1996 [JP] Japan .................................. 8-106379
Apr. 11, 1996 [JP] Japan .................................. 8-114098

[51] Int. Cl.$^6$ ....................................... C25B 11/00
[52] U.S. Cl. ...................... 204/290 F; 204/280; 204/294; 204/290 R
[58] Field of Search .................................. 204/280, 294, 204/252, 263, 290 F

[56] References Cited

U.S. PATENT DOCUMENTS

| | | | |
|---|---|---|---|
| 4,568,568 | 2/1986 | Asano et al. | 204/290 F |
| 5,399,247 | 3/1995 | Carey et al. | 204/290 F |
| 5,616,221 | 4/1997 | Aoki et al. | 204/252 |

Primary Examiner—Bruce F. Bell
Attorney, Agent, or Firm—Sughrue, Mion, Zinn, Macpeak & Seas, PLLC

[57] ABSTRACT

An electrode for electrolysis comprising an electrode base material and an electrode substance having an electrically conductive diamond structure covering the surface of the electrode base material. The electrode substance having an electrically conductive diamond structure may be a diamond containing an impurity selected from boron, phosphorus and graphite. Alternatively, the electrode substance having an electrically conductive diamond structure may comprise a composite of a diamond and an electrically conductive material. In a preferred embodiment, the electrode further comprises an interlayer comprising at least one of the carbide of a valve metal and silicon carbide disposed between the electrode base material and the electrode substance having an electrically conductive diamond structure. Also disclosed is an electrolytic cell having two chambers including an anode chamber and a cathode chamber partitioned by an ion-exchange membrane. At least one of the anode placed in the anode chamber and a cathode placed in the cathode chamber is an electrode comprising an electrode base material and an electrode substance having an electrically conductive diamond structure covering the surface of the electrode base material. An electrolytic cell having three chambers is also disclosed, including an anode chamber, an intermediate chamber and a cathode chamber partitioned by ion-exchange membranes. At least one of an anode placed in the anode chamber and a cathode placed in the cathode chamber is an electrode comprising an electrode base material and an electrode substance having an electrically conductive diamond structure covering the surface of the electrode base material.

10 Claims, 3 Drawing Sheets

ELECTRODE FOR ELECTROLYSIS AND ELECTROLYTIC CELL USING THE ELECTRODE

FIELD OF THE INVENTION

The present invention relates to an electrode for electrolysis, which has a long life and which can form an electrolyte and a gas each hardly containing impurities, and an electrolytic cell incorporating said electrode. More particularly, this invention relates to an electrode for electrolysis, which comprises an electrode substance having an electrically conductive diamond structure, and an electrolytic cell incorporating said electrode. The electrolytic cell can be used for electrolysis, etc., for forming ozone, or for forming acidic water and alkaline water. The electrolytic cell can be used for electrolyzing a corrosive electrolyte or an electrolytic solution.

BACKGROUND OF THE INVENTION

Electrolytic methods of producing various kinds of useful materials by electrolyzing water or by electrolyzing an electrolytic solution obtained by dissolving an electrolyte in water hitherto have been widely practiced. The development of these electrolytic methods has largely changed the production steps of some conventional products.

For example, for the washing step in the production of semiconductor devices or liquid crystal panels, hitherto, an organic solvent such as trichloroethane, tetrachloromethane, etc., an inorganic solvent such as hydrofluoric acid, sulfuric acid, hydrochloric acid, nitric acid, etc., or an oxidizing agent such as ozone water, hydrogen peroxide water, etc., was frequently used. However, these chemicals are not only dangerous to use, but there also are problems in that an organic solvent can cause environmental pollution such as disruption of the ozone layer, etc. In the case of an inorganic acid or a salt, many problems and costs are associated with the treatment of the waste water. Furthermore, the semiconductor devices or the liquid crystal panels which are subjected to a washing treatment using these chemicals require a large amount of super-pure water for removing chemical residues therefrom.

Moreover, besides the above mentioned semiconductor devices and liquid crystal panels, in medical treatment, food industries, etc., there are problems in that a large amount of detergent is used for sterilizing and washing. Thereafter, the detergent must be washed off with large amounts of water.

For solving these problems, a method has recently been proposed which comprises electrolyzing water or an aqueous solution containing a small amount of hydrochloric acid and a salt such as sodium chloride, ammonium chloride, etc., in an electrolytic cell partitioned with a diaphragm into an anode chamber and a cathode chamber. An aqueous solution having a high oxidation reduction potential (ORP), that is, a very high oxidative property and also a slightly acidic property is formed in the cathode chamber. On the other hand, an aqueous solution having a low ORP, that is, a very strong reductive property and also a slightly basic property is formed in the cathode chamber. These solutions are used for washing semiconductor devices, liquid crystal panels, etc., as described above.

When electrolysis is carried out by adding a small amount of sodium chloride to an electrolytic solution, acidic water having a strong sterilizing action is obtained. The sterilizing action of the acidic water is utilized in food production and for medical treatment. However, the ORP of the acidic water is high, which indicates that the chloride ion in the liquid is converted to hypochlorous acid. The hypochlorous acid can induce the formation of an organic chloride. Thus, there is a possibility of causing secondary pollution, although the possibility is very low. When the foregoing acidic water is used for washing semiconductor devices or liquid crystal panels, there is a possibility of secondary pollution as described above.

Titanium electrodes covered with platinum are usually used in this type of electrolysis. The electrodes are consumed at a rate of from about 1 to 10 $\mu$g/AH, and when these electrodes are used in an electrolytic solution for electrolysis, from 1 to 10 ppb of platinum is dissolved and mixed in the electrolytic solution. Also, when an aqueous solution of about 100 ppm of hypochlorous acid is prepared by electrolysis, an oxide electrode such as iridium oxide, etc. is used, and the electrode is consumed at a rate of about $\frac{1}{10}$ that of platinum.

The amount of the dissolved metal causes no problem in food production and in medical treatment, but is detrimental for washing semiconductors such that removing the metal becomes a large problem.

The inventors have previously succeeded in reducing the consumption of an electrode substance by a factor of about $\frac{1}{10}$ by carrying out electrolysis using an ion exchange membrane as a solid electrolyte and closely attaching an electrode to the membrane. However, even in this case, dissolution of a metal which becomes electrically conductive when dissolved in a liquid is a problem although the dissolution amount thereof is slight.

The use of ozone water has been proposed for avoiding this problem. Ozone is widely used as a strong oxidizing agent in various fields such as water treatment for washing semiconductor devices and liquid crystal panels, medical treatment, and in the food industry as described above. Ozone is mainly produced by an electrolytic method which can produce ozone at a high concentration. Also, by the development of quality electrode materials, electrolytic conditions, etc., ozone is produced with good efficiency as described, e.g., in S. Stuck et al., *Journal of Electrochemical Society*, Vol. 132, No. 2, p. 3382 et seq. (1985), U.S. Pat. No. 4,541,989, and JP-B2-44908 (the term "JP-B" as used herein means an "examined published Japanese patent application"). However, even in electrolytic ozone production, there are problems in that when a metal electrode is used, the metal is dissolved. Furthermore, when a carbon electrode is used, the electrode consumption is severe, which is unsuitable for operation over a long period of time.

To avoid contamination by the dissolved metal from a metal electrode, a non-metal type electrode may be used. Carbon is one such material that is capable of being used as a non-metal electrode.

However, because a carbon electrode is usually porous, the destruction and dissolution of the electrode tend to occur with the progress of the electrolysis. Also, when a carbon electrode is used as an anode, part of the electrode is oxidized to form a carbonic acid gas such that consumption of the electrode is accelerated. Also, even when a carbon electrode is used as a cathode, there is a problem in that the size of the hydrogen bubbles thus formed is smaller than that of oxygen at the anode side. Consequently, the electrode tends to be destroyed even though the electrode is not consumed as a carbonic acid gas. To prevent destruction of the electrode, a large electric current cannot be passed therethrough which inevitably causes a problem in that a large ORP is not obtained.

Besides the electrode for producing acidic water and alkaline water by electrolysis and further the electrode for producing ozone by an electrolysis as described above, there are metal electrodes which can be used in a corrosive atmosphere such as sodium chloride electrolysis, etc. In particular, a dimentionally stable electrode or anode (hereinafter abbreviated as DSE or DSA) is prepared by applying an electrode substance containing a platinum-group metal oxide such as ruthenium oxide onto the surface of a valve metal mainly composed of titanium. The DSE was first practically used for sodium chloride electrolysis and at present, almost all electrodes for sodium chloride electrolysis have been replaced with DSE electrodes throughout the world.

Also, DSE electrodes are useful in the field of high-speed plating, etc., which is accompanied by the generation of oxygen. Because the DSE is stable and does not deform, this electrode can be used at a reduced distance between electrodes. Also, because its overvoltage is low, and furthermore because it can hardly cause environmental pollution, the DSE electrode has been widely used in place of a conventional lead electrode. Besides these uses, the foregoing DSE has been used for waste water treatment by removing COD, the synthesis of organic or inorganic compounds by electrolytic oxidation, etc.

The foregoing DSE electrode can attain a remarkable improvement in electrolytic efficiency. However, the same characteristics which improve electrolytic efficiency can cause other problems. That is, a DSE electrode comprises a corrosion resisting valve metal base material. The valve metal base material does not corrode in many electrolytic solutions and can stably function. However, it sometimes occurs that a part of the base material is not sufficiently stable. That is, the foregoing DSE is usually produced by a thermal decomposition method. It sometimes occurs that the surface of the above-described base material is insufficiently covered with a substance, which is decomposed and attaches to the surface of the base material. An electrolytic solution which contacts the base material through the electrode substance causes a reaction, such that dissolution of the base material is not sufficiently restrained.

For example, when the forgoing DSE is disposed as an anode in an electrolytic bath filled with an organic compound such as methanol, ethanol, etc., and an electric film is applied, titanium, which is the base material metal, is corroded and the electrode substance is released. Also, when the electrolytic bath contains a halogen such as fluorine, bromine, etc., anodic polarization occurs which causes a so-called pitting corrosion or activated dissolution, such that the electrode life becomes very short.

As a counterplan, niobium or tantalum valve metals having a higher corrosion resistance than titanium are used as the base material metal. However, there metals are very expensive and hard to work, the surface thereof is very easily oxidized, and further a surface oxide tends to release from the metal. Thus, in DSE electrodes produced by forming an electrode substance on the surface of the base material metal by thermal decomposition, the treatment condition is largely restricted and at present the use range thereof is very limited.

DSE electrodes are excellent in view of energy savings, the overvoltage for generating chlorine is almost zero, and the overvoltage for generating oxygen is 500 mV or lower. Thus, when using a DSE, chlorine and oxygen tend to evolve, but the reactivity for electrolytic oxidation to a specific material and a decomposition reaction by electrolysis is weak due to the low electrolytic voltage. Therefore, a DSE is scarcely used for practical anodic oxidation.

As a counterplan, a platinum-plated electrode is partially used, but there are problems in that the electrode is very expensive and the life thereof is not always sufficient.

As another electrode, a lead oxide electrode which is scarcely consumed depending on the electrolysis conditions and having excellent oxidative power is also used. However, the lead oxide electrode is disadvantageous in that the electrode must always be anodically polarized in an electrolytic solution. This gives rise to a maintenance problem. Also, in an aqueous solution containing a halide ion, the electrode does not always show good durability.

Furthermore, as a high-overvoltage electrode particularly for electrolyzing an organic compound, a tin oxide electrode has been proposed. Because this electrode is reported to have a very high oxygen-generating overvoltage, the decomposition of an organic compound by anodic oxidation in an aqueous solution is possible, and the electrode is particularly suitable for decomposing a benzene nucleus. However, there are problems in that the electric conductivity of tin oxide itself is relatively low, such that a large current density cannot be obtained. Also, because the electrode is produced by a sintering method, a metal which becomes the core material is hard to set.

Recently, a diamond imparted with electric conductivity has been developed. Since the diamond has excellent heat conductivity, optical transmittance, and durability to high temperatures and oxidation, and in particular because the electrical conductivity can be controlled by doping, the diamond is promising as a semiconductor device and as an energy-conversion element. However, use of the diamond as an electrode for electrolysis has been scarcely reported. Swain et al. reported the stability of diamond in an acidic electrolytic solution and suggested that diamond was far excellent as compared with other carbon materials as described in *Journal of Electrochemical Society*, Vol. 141, 3382$^-$(1994). Also, Fujishima et al., considered the application of diamond as an electrode for a reduction reaction in view of its wide band gap of 5.5 eV as described in *Journal of Electroanalytical Chemistry*, Vol. 396, 233$^-$(1995) and *Denkikagaku* (*Electrochemistry*), Vol. 60, No. 7, 569$^-$ (1992). Furthermore, a humidity sensor utilizing the change in surface resistance of diamond with a change in humidity was also reported in *Denkiron* (*Electric Theory*), Vol. 114, No. 5, 413$^-$(1994).

However, the industrial utilization of diamond in a high-potential region capable of generating oxygen and capable of generating chlorine in the case of high current density has not yet been reported.

SUMMARY OF THE INVENTION

Thus, an object of the present invention is to solve the problems of the above described conventional techniques and to provide an electrode for an electrolysis comprising an electrode substance which does not dissolve in an electrolytic solution, having excellent durability, and which can be used for various kinds of electrolysis. It is also an object of the present invention to provide an electrolytic cell incorporating said electrode.

That is, according to a first aspect, the present invention provides an electrode for electrolysis comprising an electrode base material and an electrode substance having an electrically conductive diamond structure covering the surface of said base material.

The electrode base material is made of a valve metal, and an interlayer may be formed between the electrode base material and the electrode substance having an electrically conductive diamond structure as described above.

Also, according to the a second aspect, the present invention provides an electrolytic cell having two chambers including an anode chamber and a cathode chamber partitioned by an ion-exchange member or three chambers including an anode chamber, an intermediate chamber, and a cathode chamber partitioned by ion-exchange members, wherein at least one of an anode placed in the anode chamber and a cathode placed in the cathode chamber is an electrode comprising an electrode base material and an electrode substance having an electrically conductive diamond structure covering the surface of said base material.

The electrode may be replaced with an electrode base material made of a valve metal, an interlayer containing the carbide of a valve metal and/or silicon carbide covering the surface of said electrode base material, and an electrode substance having an electrically conductive diamond structure covering the surface of said interlayer.

DETAILED DESCRIPTION OF THE INVENTION

Figure 1:
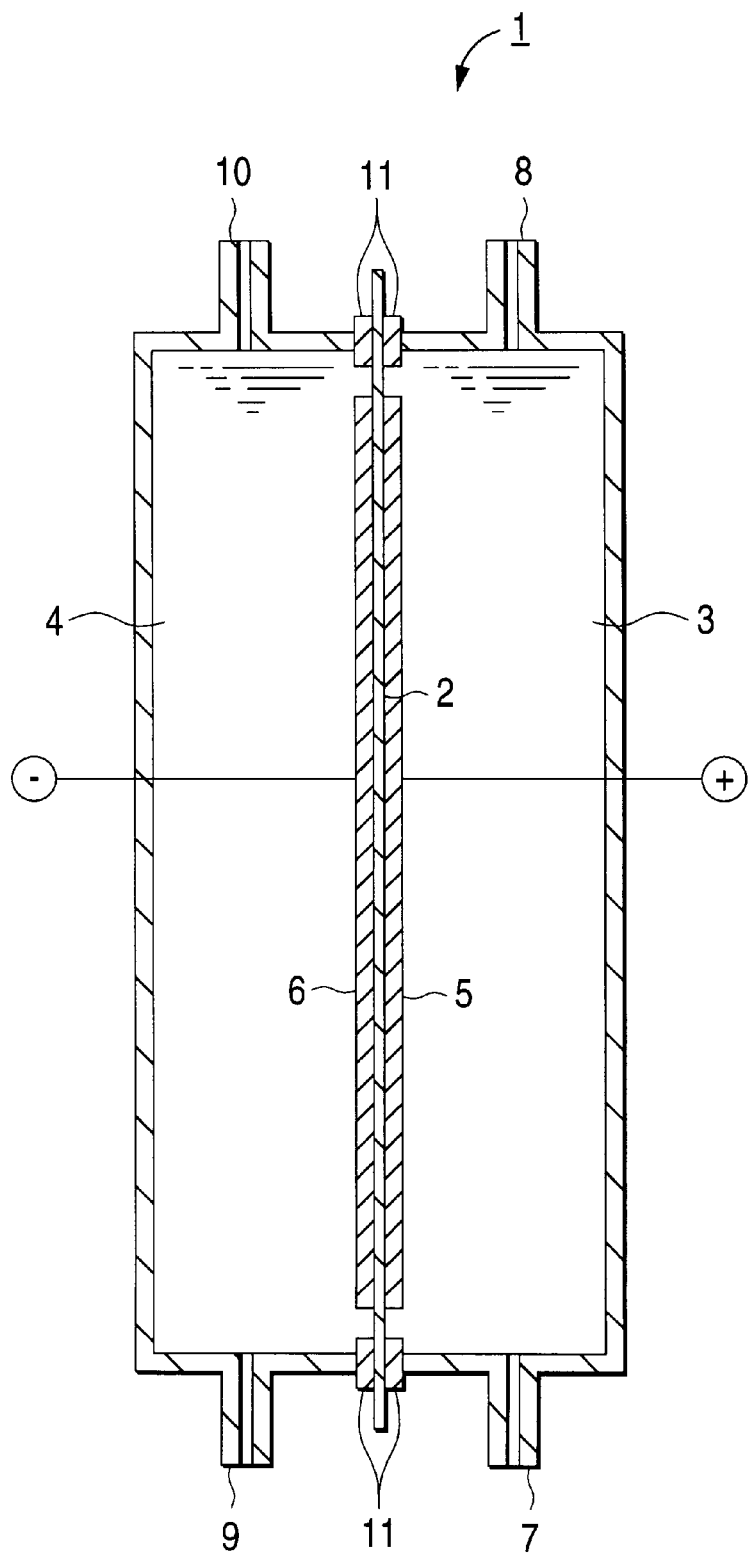
FIG. 1 is a schematic cross-sectional view showing an example of a double chamber-type electrolytic cell of the present invention.

The present invention is described in detail below.

The electrode for electrolysis of the present invention and the electrolytic cell of this invention incorporating said electrode can be widely used for various electrolyses. In particular, they can be used in an electrolysis for producing electrolytic solutions (acidic water and alkaline water, or ozone water) or a gas, which are used for washing semiconductor devices or liquid crystal panels. Contamination of the electrolytic solutions and the gas thus produced with impurities is extremely undesirable. When the electrolysis of a corrosive electrolytic solution is carried out using conventional electrodes, the electrodes are consumed in a relatively short time and the electrolysis cannot be continued.

In the present invention, an electrode substance having an electrically conductive diamond structure is used. The electrode substance having an electrically conductive diamond structure includes a diamond rendered electrically conductive by doping with an impurity such as boron, phosphorus, graphite, etc.; a composite material of a diamond and, for example, amorphous boron oxide, etc., (DLN, diamond nano composite), silicon carbide, etc. In addition, in the case of adding graphite, it is unnecessary to add graphite directly to the diamond, but another process is possible. For example, in the case of obtaining diamond by a CVD method as described below, by controlling the amount of hydrogen gas in the CVD reactor or by slightly changing the deposition temperature, a slight amount of graphite can coexist with the diamond thus obtained.

The electrode substance covers the surface of the electrode base material in a conventional manner to constitute the electrode. The electrode substance preferably comprises fine particles having a particle size ranging from 0.01 to 1 $\mu$m. The thickness of the cover on the base material is from about 0.1 to 50 $\mu$m, and more preferably from 1 to 10 $\mu$m, to prevent the electrolytic solution from penetrating into the base material. The diamond used as the electrode substance must be electrically conductive. Thus, a ground natural diamond cannot be used and is also very expensive. Consequently, a synthetic diamond obtained by reducing an organic compound is preferred.

The synthetic diamond can be synthesized by a heat CVD (chemical vapor deposition) method of thermally decomposing an organic compound such as methanol, ethanol, etc., as a carbon source in a reducing atmosphere such as hydrogen gas. The synthetic diamond may also be synthesized by another method, for example, a physical vapor deposition (PVD) method or a plasma CVD method, but the use of the CVD method which has an extremely high film-forming speed is preferred. The above described heating is usually carried out by contacting the vapor of the organic compound with a heated filament. Depending on the capacity of the apparatus, the treatment speed, etc., the temperature of the filament is preferably from 800 to 2,400° C. and the temperature of the base material reaches a temperature of from 750 to 950° C. In this case, the concentration of the organic compound vapor in the hydrogen gas is preferably from 0.1 to 10% by volume, the total gas flow rate is from 10 to 1,000 ml/minute, and the pressure is atmospheric pressure.

Because the synthetic diamond as an electrode substance covers the base material, the synthetic diamond formed by the reducing operation described above preferably is directly deposited on the surface of the electrode base material without being isolated. Diamond itself is not electrically conductive. Usually, by mixing an impurity in the organic compound as a raw material and attaching it together with the foregoing organic compound onto the base material, a synthetic diamond having good electric conductivity is obtained. The impurity described above may be a simple substance composed of an element having a different valence than carbon or a compound containing the simple substance. For example, powdered boric acid (boron oxide) and diphosphorus pentaoxide can be used. In addition to the above compounds, diborane ($B_2H_6$) and phosphine ($PH_3$) can be also used as the impurity, but since these compounds have a high toxicity, powdered boric acid or diphosphorus pentaoxide are preferred. The content of the impurity is preferably from 1 to 10,000 ppm, and more preferably from 100 to 1,000 ppm. The resistivity of the electrically conductive diamond thus obtained can be controlled in the range of from 100 to 0.1 $\Omega$.cm.

In addition to diamond, silicon carbide, titanium carbide and/or tungsten carbide each having a diamond structure can be attached onto the base material by utilizing CVD or PVD as in the case of diamond. For attaching a carbide, a plasma flame-coating method is preferably used such that the carbide is attached in the form of electrically conductive particles and the electric conductivity is further increased by subjecting the particles to a high temperature treatment. In the case of using a plasma flame-coating method, for completely covering the base material metal, a thicker cover must be formed than in the case of using the CDV method. When the electrode substance is titanium carbide, the thickness is suitably from 10 to 20 $\mu$m but as a matter of course, the thickness may be outside this range. On the other hand, silicon carbide is inexpensive and has a high electrical conductivity. Also, silicon carbide has an advantage in that it is effective for electrolysis in a halogen-containing electrolytic bath, and the thickness of the silicon carbide cover is preferably from about 50 to 200 μm.

The foregoing base material may function as a collector. Titanium, niobium, tantalum, silicon, carbon, nickel, tungsten carbide, etc., can be used, and the base material may be in the form of a wire gauze, a sintered powder, sintered metal fibers, etc. In the case of electrolyzing an electrolytic solution containing corrosive component(s), the dissolution of the electrode substance occurs although the dissolved amount thereof is very slight. This is different from the case of electrolyzing pure water. Taking into consideration the stability of the base material, in the case of electrolyzing an electrolytic solution containing corrosive component(s), niobium or tantalum is desirably used having a high corrosion resistance.

The surface of the base material is covered with the electrode substance having an electrically conductive diamond structure directly or through an interlayer. In this case, for improving the adhesion of the interlayer or the electrode substance having an electrically conductive diamond structure and the base material, and also for substantially lowering the current density, the surface of the base material is preferably roughened. For use under high-current density conditions, the surface of the base material is largely roughened using an alumina grit, etc., of about #20 size. For use under a relatively low current density and corrosive conditions, surface roughening of the base material is preferably carried out with a fine alumina sand of from about #60 to #120 size to improve adhesion.

The interlayer described above serves to more strongly bind the base material and the electrode substance having an electrically conductive diamond structure. The interlayer desirably has an affinity for both the base material metal and the electrode substance having an electrically conductive diamond structure, and the thickness of the interlayer is from about 1 to 10 μm.

The interlayer is made of the carbide of a valve metal and/or silicon carbide. For example, suppose that the base material metal is titanium and titanium carbide is used as the interlayer. Since the titanium of the base material metal has an affinity for the titanium carbide of the interlayer, and further, because the foregoing titanium carbide and diamond have carbon as a common element, and further, because the foregoing titanium carbide has a diamond structure, the affinity between the interlayer and the electrode substance having an electrically conductive diamond is further improved to provide a strong bonding force and excellent durability. In addition, for improving the electric conductivity of titanium carbide, plasma flame-coating can be carried out after previously immersing a titanium carbide powder in an aqueous boric acid solution to form a coating of boric acid on the surface of the powder. Due to the high temperature during flame coating, part of the boron is incorporated into the titanium carbide structure to improve the electric conductivity thereof.

The surface of the cover layer which is the electrode substance having an electrically conductive diamond structure can be further covered with yet a second electrode substance. The second electrode substance may be properly selected depending on the use of the electrode for electrolysis as described above. Even when the durability of the electrode substance is deteriorated to a small extent, stable electrolytic operation can be continued for a long period of time. This is because permeation of the electrolytic solution and oxygen is restrained by the presence of the interlayer having a material of an electrically conductive diamond structure as described above. However, as a matter of course, the use of an electrode substance having good durability is desirable, and the use of an electrode substance made of a platinum-group metal such as platinum, palladium, iridium, ruthenium, osmium, rhodium, etc., and oxides thereof, for example, a composite oxide of iridium oxide and tantalum oxide, is preferred.

The electrode substance may be applied onto the surface of the underlayer by a known thermal decomposition method. For example, after coating a solution of a mixture of iridium chloride and butyl tantalate as a coating liquid on the surface of the foregoing interlayer followed by drying, thermal decomposition is carried out. If necessary, the operation may be repeated to cover the surface of the interlayer with the desired amount of the electrode substance. In this case, the operation is preferably repeated from 10 to 30 times.

The electrode thus produced has a high electrode potential and excellent durability, and can be used as both an anode and a cathode. However, because acidic water formed in the anode chamber is preferably used for washing, the electrode is particularly preferably used as an anode. When the electrode is an anode and when an oxygen-reduction electrode is used as a cathode, which is a counter electrode, the generation of hydrogen formed by an ordinary cathodic reaction is restrained. As a result, the hydrogen thus generated does not diffuse into the anode chamber side.

When the electrode of the present invention is incorporated into an electrolytic cell, the electrode is placed in at least one of the anode chamber and cathode chamber of an electrolytic cell partitioned by one or more ion-exchange membranes into two chambers, i.e., the anode chamber and the cathode chamber, or into three chambers, i.e., the anode chamber, an intermediate chamber, and the cathode chamber.

The ion-exchange membrane for use in the present invention may be a fluorine resin-series ion-exchange membrane or a hydrocarbon resin-series ion-exchange membrane, but from the point of the corrosion resistance, the former ion-exchange membrane is preferably used. The ion-exchange membrane prevents the ions formed at the anode or the cathode from being consumed at the counter electrode, and also allows the electrolysis to quickly proceed when the electric conductivity of the electrolytic solution is low.

In the case of using the foregoing electrode in a two chamber-type electrolytic cell as a gas electrode, the cathode chamber is formed between the ion-exchange membrane and the cathode or the anode chamber may be formed between the anode and the ion-exchange membrane. However, when the electric conductivity of the electrolytic solution is low and the cell voltage is increased, the structure of the cell becomes complicated. Furthermore, a gas-liquid separation is required at each electrode. Thus, a structure where the electrode is connected to the ion-exchange membrane is most desirable. In this case, the anode chamber substantially becomes gas chamber and on the other hand, the cathode chamber acquires a gas-liquid mixed state.

The material for the electrolytic cell differs depending on the electrolytic solution used therein and the gas that is formed, etc., but from the viewpoints of durability and stability, the use of a glass-lined material, carbon, a corrosion-resistant metal such as titanium, stainless steel, a PTFE resin, etc., is desirable.

Where it is desirable to closely contact the electrode and the ion-exchange membrane, these materials may previously be bonded mechanically, or pressure may be applied during the electrolysis. The applied pressure is preferably from 0.1 to 30 $kgf/cm^2$.

The electrolytic conditions vary depending on the electrolytic solution that is used, etc., but the temperature is preferably from 5 to 40° C. and the current density is preferably from 1 to 500 A/dm².

The electrode for electrolysis of the present invention and the electrolytic cell incorporating said electrode can be widely applied to uses which include the electrolysis for producing acidic water and alkaline water, the electrolysis of a corrosive electrolytic solution, etc., as described above.

When water electrolysis is carried out by adding chloride to the anode chamber, hypochlorous acid is formed in the anode chamber. Due to the hypochlorous acid thus formed, the electrolytic solution in the anode chamber becomes acidic to form acidic water. On the other hand, in the cathode chamber, in ordinary water electrolysis, weak alkaline water is formed. When the electrode substance having an electrically conductive diamond structure as described above is used as the anode substance in electrolysis, the electrode substance is not dissolved even when the electrolysis is continued for a long period of time. Consequently the acidic water thus obtained contains no metal, and acidic water of high purity is obtained. The acidic water is most suitable for use as washing water, etc., for processing semiconductor devices.

Also, when pure water is supplied to the anode chamber and electrolysis is carried out, ozone is formed according to following formula (1).

$$3H_2O \rightarrow O_3 + 6H^+ + 6e \qquad (1)$$

When the electrode substance having an electrically conductive diamond structure as described above is used to form ozone, the ozone thus formed is not mixed with the electrode substance, and an ozone gas and ozone water each having a very high purity can be obtained.

Furthermore, in industrial electrolysis, it is sometimes necessary to electrolyze an electrolytic solution containing a corrosive component such as fluorine, bromine or iodine. When a conventional DSE is used for electrolyzing an electrolytic solution containing such corrosive components, not much trouble occurs in an electrolysis of short duration. However, when the electrolysis is carried out for a long period of time, the foregoing DSE is consumed and stable electrolysis cannot be continued. On the other hand, when the electrode of the present invention comprising an electrode substance having an electrically conductive diamond structure is used, the durability of the electrode in the electrolytic solution containing the corrosive component is far higher than that of a DSE, and stable electrolytic operation for a long period of time becomes possible.

The electrode for electrolysis of the present invention and the electrolytic cell incorporating said electrode are illustrated based on the accompanying drawings.

Figure 2:
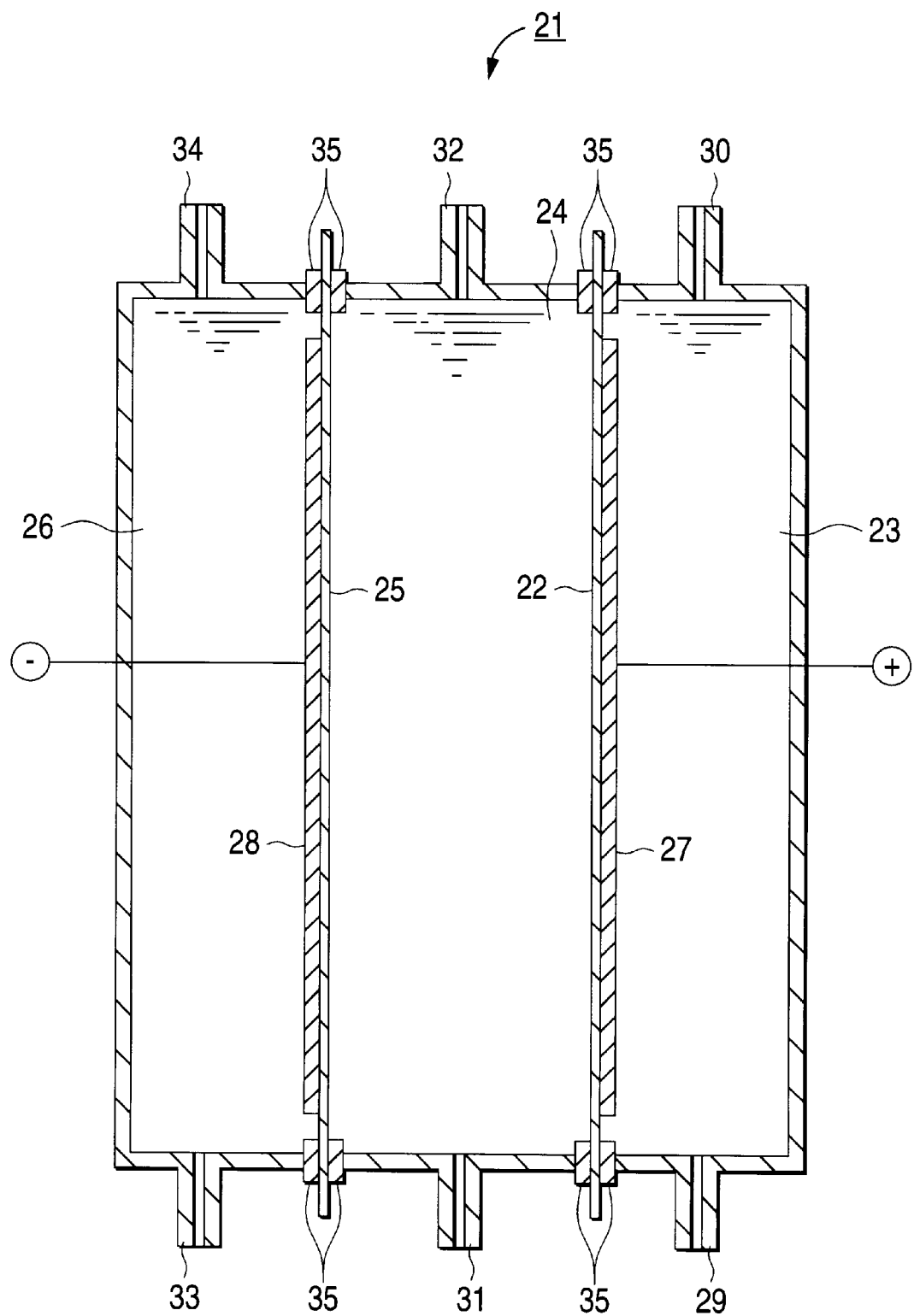
FIG. 2 is a schematic cross-sectional view showing an example of a three-chamber-type electrolytic cell of the present invention.
Figure 3:
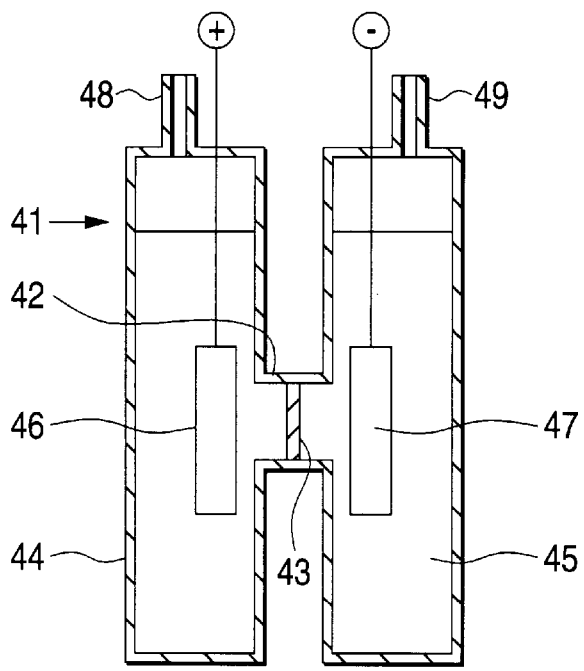
FIG. 3 is a schematic cross-sectional view showing another example of a double chamber-type electrolytic cell of the present invention.

FIG. 1 is a schematic cross-sectional view showing an example of a double chamber-type electrolytic cell of the present invention. FIG. 2 is a schematic cross-sectional view showing an example of a three-chamber-type electrolytic cell of the present invention. FIG. 3 is a schematic cross-sectional view showing an example of another double chamber-type electrolytic cell of the present invention.

In FIG. 1, the double chamber-type electrolytic cell 1 is partitioned by an ion-exchange membrane into an anode chamber 3 and cathode chamber 4. An anode 5 made of an electrode substance having an electrically conductive diamond structure is closely attached to the anode chamber side 3 of the ion-exchange membrane 2. A porous cathode 6 made of, for example, a metal mesh, is closely attached to the cathode chamber side 4 of the ion-exchange member 2. At the lower and upper surfaces of the anode chamber 3 are inlet 7 for pure water or an aqueous salt solution and outlet 8 for acidic water, respectively. At the lower and the upper surfaces of the cathode chamber 4 are inlet 9 for pure water and outlet 10 for alkaline water, respectively. In addition, a packing 11 is formed between the ion-exchange membrane 2 and a wall of the electrolytic bath.

In FIG. 2, the three-chamber-type electrolytic cell 21 is partitioned by a cation-exchange membrane 22 into anode chamber 23 and intermediate chamber 24, and by another cation-exchange membrane 25 into the foregoing intermediate chamber 24 and cathode chamber 26. An anode 27 made of an electrode substance having an electrically conductive diamond structure is closely attached to the anode chamber side 23 of the foregoing cation-exchange membrane 22, and a porous cathode 28 is closely attached to the cathode chamber side 26 of the foregoing cation-exchange membrane 25.

At the lower and upper surfaces of the anode chamber 23 are formed inlet 29 for pure water and outlet 30 for acidic water, respectively, at the lower and upper surfaces of the intermediate chamber 24 are formed inlet 31 for an aqueous solution of a salt such as ammonium chloride and outlet 32 for the aqueous salt solution, respectively, and at the lower and upper surfaces of the cathode chamber are formed inlet 33 for pure water and outlet 34 for alkaline water, respectively. In addition, packings 35 are formed between the ion-exchange membrane 22 and the circumference portion and between the ion-exchange membrane 25 and the circumference portion thereof, respectively.

In FIG. 3, a double chamber-type electrolytic cell 41 is partitioned by an ion-exchange membrane 43 disposed at a connecting portion 42 having a small diameter into anode chamber 44 and cathode chamber 45. Anode 46 made up of an electrode substance having an electrically conductive diamond structure is hung in anode chamber 44 apart from the foregoing ion-exchange membrane 43. In the cathode chamber 45 porous cathode 47 made of, for example, a metal mesh, is hung apart from ion-exchange membrane 43. At the upper surfaces of anode chamber 44 and cathode chamber 45 are gas outlet 48 and gas outlet 49, respectively.

In the electrolytic cells 1 and 21 shown in FIG. 1 and FIG. 2, respectively, when pure water or an aqueous ammonium chloride solution is supplied through the inlet 7 or an aqueous solution of a salt such as sulfuric acid salt, etc., is supplied through the inlet 31, and an electric current is passed between electrodes 5 and 6 or between electrodes 27 and 28, acid water is formed in the anode chamber and alkaline water is formed in the cathode chamber. Furthermore, in at least in the anode chamber, acid water free from a metal component is formed because the foregoing diamond is not dissolved.

Also, in the electrolytic cell 41 shown in FIG. 3, when an electrolytic solution is filled in anode chamber 44 and cathode chamber 45, and an electric current is passed between electrodes 46 and 47, a product gas is generated. In this case, since at least one of the electrodes comprises an electrode substance having an electrically conductive diamond structure and said diamond is not dissolved, an electrolyte and a gas each of which do not contain impurities are obtained.

The electrode for electrolysis of the present invention and the electrolytic cell of this invention using the foregoing electrode are further described by reference to the following Examples. However, the present invention should not be construed as being limited thereto.

EXAMPLE 1

Figure 4:
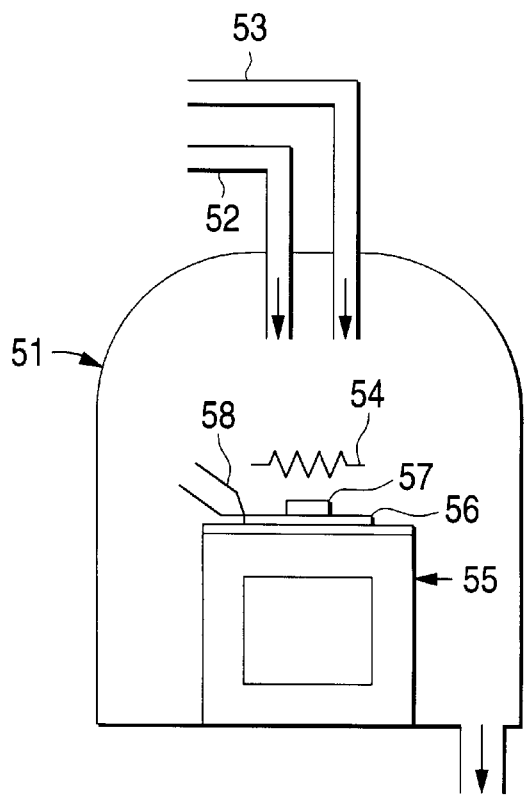
FIG. 4 is a schematic view showing an apparatus for producing an electrically conductive diamond structure employed in the Examples of this invention.

Using ethanol as a raw material and using an apparatus 51 for producing an electrically conductive diamond structure by a thermal CVD method as shown in FIG. 4, a thin diamond layer having a thickness of 10 μm was formed on a porous graphite plate (base material) having a thickness of 2 mm (electrode area 1 cm²).

That is, while keeping the pressure in the chamber constant, ethanol vapor as a reaction raw material gas having dissolved therein a slight amount of powdery boric acid (boron oxide) as an impurity for imparting electric conductivity and hydrogen gas for providing a reducing atmosphere and forming diamond thin layer in the following process, were introduced through inlet 52 for the reaction raw material gas and inlet 53 for the hydrogen gas, respectively. The ethanol vapor thus introduced was decomposed by a heated tungsten filament 54 and a diamond, which is the decomposition product of the foregoing ethanol, accumulated on the base material 57 which was placed on a molybdenum cover 56 and on a base material holder 55 disposed under the filament 54 (distance 3 cm). In addition, the temperature of the base material was kept at a temperature of from 700 to 750° C. by monitoring with a thermocouple 58.

The diamond layer thus formed was evaluated by an electron microscope and Raman spectral analysis. The surface of the diamond layer was polycrystalline, but a change in form by addition of the impurity was not observed. The lattice plane spacings calculated by electron diffraction almost coincided with the values of diamond as reported in the JCPDS (Joint Committee on Powder diffraction Standards) Card for identifying the materials from X ray diffraction collected by international union of crystallography. In the Raman spectral analysis, a sharp peak corresponding to diamond was observed near 1332 cm$^{-1}$ and also a noncrystalline peak was observed near 1550 cm$^{-1}$, but the peak intensity of the latter was very slight. From the analyses described above, it was confirmed that the thin layer formed on the base material was a polycrystalline diamond.

The diamond covered porous carbon plate was closely adhered to one surface of a cation-exchange membrane, Nafion 117 (trade name, made by E.I. du Pont de Numerous and Company) as an anode. A nickel-made porous cathode carrying a ruthenium oxide catalyst was closely adhered to one surface of a cation-exchange membrane, Nafion 350 (trade name, made by Du Pont) as a cathode. Both of the cation-exchange membranes were disposed in an electrolytic cell at a distance of 3 mm such that the anode and the cathode faced outside. Nafion resin particles (NR 50) were packed in the intermediate chamber formed between the cation-exchange membranes. Furthermore, the cation-exchange membranes were tightened from the outside to constitute an electrolytic cell as shown in FIG. 2.

Pure water was supplied to the anode chamber at 1 ml/minute, to the intermediate chamber at 10 ml/minute, and to the cathode chamber at 3 ml/minutes. Electrolysis was carried out at a temperature of 20° C. and an electric current of 1 A. The cell voltage was 9.5 V. Acidic water having an ozone concentration of 0.5 mg/liter and an ORP of 1,000 mV was obtained from the outlet of the anode chamber.

EXAMPLE 2

A diamond layer having a thickness of 10 μm and containing boron was formed by a CVD method on a porous metal plate made of titanium mesh having an electrode area of 1 cm² and a thickness of 1 mm to provide an anode. A graphite-made porous electrode having formed thereon a diamond layer in the above manner was used as a cathode. Then, the whole assembly was tightened such that the anode was closely attached to a cation-exchange membrane, Nafion 117, to constitute an electrolytic cell as shown in FIG. 1.

While supplying 30 g/liter of aqueous hydrochloric acid solution to the anode chamber at 10 ml/minute and pure water to the cathode chamber at 3 ml/minute, electrolysis was carried out at a temperature of 20° C. and an electric current of 1 A. The cell voltage was 8.5 V. Acidic water having an effective chlorine concentration of 0.5 mg/liter, a pH of 2.5, and an ORP of 1,200 mV was obtained from the outlet of the anode chamber.

EXAMPLE 3

Using the same electrolytic cell as in Example 2, 30 g/liter of an aqueous hydrochloric acid solution was supplied to the anode chamber at 10 ml/minute and oxygen gas from an oxygen cylinder was supplied to the cathode chamber at a rate of 50 ml/minute. Electrolysis was carried out at a temperature of 20° C. and an electric current of 1 A. The cell voltage was 8.5 V. Acidic water having an effective chlorine concentration of 0.5 mm/liter, a pH of 2.5, and an ORP of 1,200 mV was obtained from the outlet of the anode chamber. On the other hand, alkaline water containing 1 g/liter of hydrogen peroxide was obtained from the outlet of the cathode chamber at a current efficiency of 5%.

EXAMPLE 4

Using the anode and the cathode of Example 1, the electrolytic cell of FIG. 1 was constructed as described in Example 2. Pure water was supplied to the anode chamber at 1 ml/minute. Electrolysis was carried out at a temperature of 20° C. and an electric current of 1 A. The cell voltage was 8.5 V, and an ozone gas of 5% by weight was obtained from the outlet of the anode chamber.

EXAMPLE 5

The same electrolytic cell as in Example 4 was constructed, except that a carbon paper-made porous electrode carrying a platinum catalyst was used as the cathode. Pure water was supplied to the anode chamber at 1 ml/minute and oxygen gas was supplied from an oxygen cylinder to the cathode chamber at a rate of 50 ml/minute. Electrolysis was carried out at a temperature of 20 ° C. and an electric current of 1 A. The cell voltage was 7.5 V, and an ozone gas of 5% by weight was obtained from the outlet of the anode chamber.

EXAMPLE 6

An anode was prepared by forming a diamond layer having a thickness of 10 μm on the surface of a titanium plate having an electrode area of 1 cm² and a thickness of 1 mm in the same manner as in Example 1. A platinum plate having the same electrode area and the same thickness was used as a cathode. Both electrodes were disposed in a Pyrex glass-made H-type electrolytic cell as shown in FIG. 3 filled with 100 ml of 1 M sulfuric acid. Electrolysis was carried out at a temperature of 5° C. and an electric current of 1 A. The cell voltage was 10.5 V, the anodic potential was 5 V (vs. a mercurous sulfate reference electrode) and an ozone gas of 8% by weight was obtained from the outlet of the anode chamber.

EXAMPLE 7

An electrolytic cell having the same construction as in Example 6 was prepared except that Teflon (registered trade name, made by E.I. du Pont du Nemours and Company) was used as the material for the electrolytic cell. 100 ml of 1 M sulfuric acid and 0.01 M hydrofluoric acid were filled in the electrolytic cell. Electrolysis was carried out at a temperature of 5° C. and an electric current of 1 A. The cell voltage was 11 V, the anodic potential was about 5 V (vs. a mercurous sulfate reference electrode), and an ozone gas of 12% by weight was obtained from the outlet of the anode chamber.

EXAMPLE 8

The surface of a titanium plate as a base material was blasted using a #20 alumina grit at a pressure of 5 kg/cm$^2$. The surface roughness, JIS B0601 Ra, was 10.2 μm. Furthermore, the surface thereof was etched in 20 wt % hydrochloric acid at 90° C. for 15 minutes. On the surface of the titanium base material thus prepared was formed a diamond layer doped with boron by the same thermal CVD method as in Example 1, except that argon gas added to hydrogen was used as the atmospheric (reactor) gas and the pressure was changed to 10$^{-3}$ torr. After carrying out the operation for 60 minutes, a diamond layer having a thickness of about 50 μm and containing about 1,000 ppm of boron was formed on the surface of the base material, which was used as the anode.

The electrolytic cell shown in FIG. 3 was used, the anode described above and a cathode composed of a platinum plate were disposed in said electrolytic cell, sulfuric acid (200 g/liter) was filled in the electrolytic cell, and electrolysis was carried out. The oxygen-generating potential at a temperature of 60° C. was 2.44 V vs. NHE, which was about 800 mV higher than that of an iridium oxide-series DSE.

For evaluating the consumption of the electrode by the continuous electrolysis, the electrolysis was carried out for 500 hours at a current density of 200 A/cm$^2$. Because the consumed amount could not be accurately measured by a fluorescent X ray technique, the consumed amount was measured by a weight method. As the result, it was found that consumption was not observed within the measurement accuracy and the electrode was very stable.

EXAMPLE 9

By following the same procedure as in Example 8, except that a porous plate of niobium was used as the base material metal and the porous plate was subjected to etching using 4% hydrofluoric acid at room temperature for 15 minutes, a diamond layer was formed on the surface of the base material by a thermal CVD method to form an anode. The thickness of the diamond layer was about 10 μm.

The anode was disposed in the anode chamber of a three-chamber electrolytic cell partitioned by 2 cation-exchange membranes by closely attaching the anode to one of the cation-exchange membranes. In the cathode chamber a carbon paper was disposed as a cathode and attached to another cation-exchange membrane. Pure water was filled in the anode chamber and an aqueous iodine solution was filled in the intermediate chamber.

When an electric field was applied between the electrodes, oxygen gas was obtained from the anode chamber and an aqueous hydrogen iodide solution was obtained from the cathode chamber. When the electrolysis was continued for 1,000 hours at a current density of 5 A/dm$^2$, there was no change in the electrode.

COMPARATIVE EXAMPLE 1

Electrolysis was carried out under the same conditions as in Example 9, except that an ordinary DSE made of a titanium base material covered with ruthenium oxide was used as the anode. The electrode began to corrode after about 3 hours from the initiation of the electrolysis, and the electrode became unusable after 5 hours. It is considered that the titanium was corroded by iodine permeating through the cation-exchange membrane.

EXAMPLE 10

Titanium was used as a base material metal, and the surface thereof was blasted using a #18 alumina grit at a pressure of 5 kg/cm$^2$. The base material was pickled in 25% sulfuric acid for 3 hours. After drying, a silicon carbide powder having an average particle size of 40 μm and an electric conductivity of 1 Ω.cm was plasma flame-coated on the surface of the base material to a thickness of 40 μm to form an anode.

Using the anode and a cathode made of a platinum plate, electrolysis was carried out in 200 g/liter of an aqueous sodium chloride solution. The anodic potential (chlorine-generating potential) was 1.44 V vs. NHE at 30 A/dm$^2$, which was about 800 mV higher than the iridium oxide series DSE. However, the oxygen concentration in the chlorine generated by electrolysis was 0.2% or lower at pH 3, and it was found that the selectivity of the reaction was very excellent. Also, as an accelerated electrolysis test, the electrolysis was carried out for 500 hours at 200 A/dm$^2$. Electrode consumption was scarcely observed.

EXAMPLE 11

Titanium carbon powder having an average particle size of about 40 μm was plasma flame-coated on the surface of a titanium base material as in Example 1 to form an interlayer having a thickness of about 30 μm. On the surface of the interlayer a diamond layer was formed having a thickness of about 30 μm under the same conditions as in Example 8 to form an anode.

Using the anode and a cathode made of a platinum plate, electrolysis was carried out in an aqueous solution of 3% hydrobromic acid at a temperature of 60° C. and a current density of 100 A/dm$^2$ for 500 hours. After the electrolysis, electrodes consumption was not observed and the titanium was not corroded.

COMPARATIVE EXAMPLE 2

Electrolysis was carried out under the same conditions as in Example 11, except that an ordinary DSE made of a titanium base material covered with ruthenium oxide was used as the anode. The electrolysis was very stable at a current density of 5 A/cm$^2$ or lower but at a high current density of 20 A/cm$^2$ or higher, titanium destruction had occurred. Three to five hours after initiating the electrolysis, an electric current could not be passed through the cell.

EXAMPLE 12

A commercially available pure titanium plate having a thickness of 1.5 mm was used as a base material metal, and the surface thereof was blasted with #60 alumina sand at a pressure of 4 kg/cm$^2$. After removing the blast sand remaining on the surface with a wire brush, the titanium plate was pickled in boiling 20% hydrochloric acid for 15 minutes. The surface roughness, JIS B0601 Ra, of the base material metal was 6 μm.

A diamond layer having a thickness of 1 μm was formed on the base material in the same manner as in Example 1, using ethanol as the raw material, and also using the apparatus 51 for producing an electrically conductive diamond structure by a thermal CVD method as shown in FIG. 4.

The surface of the diamond layer on the base material was coated with a solution of a mixture of iridium oxide and butyl tantalate (2:1 metal mol ratio) dissolved in a mixed solvent of butyl alcohol and hydrochloric acid. After drying, thermal decomposition was carried out in an air stream at a temperature of 530° C. for 10 minutes. By repeating the operation 12 times, the diamond layer was covered with an electrode substance of 0.05 mol/m² as an iridium conversion product.

The diamond layer was evaluated by an electron microscope and Raman spectral analysis. The surface of the diamond layer was polycrystalline, but a change in form due to addition of impurities was not observed. The lattice space calculated by electron diffraction almost coincided with the reported value of a diamond by JCPDS Card. In the Raman spectral analysis, the sharp peak corresponding to diamond was observed near 1331 cm$^{-1}$, and a noncrystalline peak was observed near 1550 cm$^{-1}$ although the intensity of the latter peak was very slight. From the analyses described above, it was confirmed that the thin layer thus formed was a polycrystalline diamond.

The electrode thus prepared was attached to one surface of a cation-exchange membrane, Nafion 117 (trade name, made by du Pont) as an anode, and a zirconium plate was used as the counter electrode. After immersing both electrodes in 20% sulfuric acid (80° C.), electrolysis was carried out at a current density of 300 A/dm². In this case, even after 2,000 hours after initiating electrolysis, the electrolysis could be further continued.

COMPARATIVE EXAMPLE 3

The same procedure was followed as in Example 12, except that an interlayer was not formed. The surface of the titanium base material was oxidized at 600° C. for 2 hours to form a corrosion resisting oxide on the surface of the base material and the surface thereof was directly covered with the electrode substance. An electrode was produced, and when the electrolytic test was carried out as in Example 12 using the electrode as an anode, after 600 hours, the cover was released. This was considered to corrode the base material such that electrolysis could not be continued.

EXAMPLE 13

For increasing the surface roughness of the titanium base material used in Example 12, the surface thereof was blasted using #18 alumina sand to make the surface roughness, JIS B0601 Ra, 12 μm.

By plasma flame-coating titanium carbon particles on the surface of the titanium base material in helium including a small amount of hydrogen as an atmospheric gas, a titanium carbide cover, which was an interlayer having a thickness of 50 μm, was formed on the surface of the base material. The titanium carbide layer was electrically conductive and the electric resistance was about 1 Ω/cm² to the cover layer.

After covering the surface of the interlayer with an electrode substance under the same conditions as in Example 12, an electrolytic test was carried out under the same conditions as in Example 12. After 1,500 hours, the electrolysis could be continued and no electrode deterioration was observed.

EXAMPLE 14

The production of an electrode and an electrolytic test were carried out under the conditions of Example 13, except that an interlayer having a thickness of 40 μm was formed using silicon carbide in place of titanium carbide. As in Example 13, after 1,500 hours, the electrolysis could be continued and no electrode deterioration was observed.

EXAMPLE 15

The production of an electrode and an electrolytic test were carried out under the conditions of Example 13, except that tungsten carbide was used in place of titanium carbide. After 2,000 hours, the electrolysis could be continued and no electrode deterioration was observed.

In a first embodiment, the present invention is directed to an electrode for electrolysis comprising an electrode base material and an electrode substance having an electrically conductive diamond structure covering the surface of said electrode base material.

When the electrode comprising an electrode substance having an electrically conductive diamond structure is used for water electrolysis or the electrolysis of an electrolytic solution containing corrosive component(s), due to the durability of said diamond, electrode consumption, that is, dissolution of the electrode substance, scarcely occurs. Also, stable electrolytic operation can be continued for a long period of time and dissolution of said electrode substance still does not occur. As a result, the anolyte, the catholyte, and the gas produced by the electrolytic operation do not contain an impurity due to dissolution of the electrode substance, and an electrolytic solution or product gas having a high purity is obtained.

The electrolytic solutions, in particular, the anolyte produced using the electrode of the present invention, meets the requirements for washing water, and, in particular, for washing semiconductor devices. This operation requires extremely low impurity levels, and the anolyte can be used with good efficiency as said washing water.

Furthermore, an ozone gas or ozone water formed in an anode chamber by water electrolysis is used not only for washing semiconductor devices, but also for washing in various industries or for sterilizing, etc. In the case of ozone gas, etc., as a matter of course, the mixed amount of impurities is expected to be at a minimum. The ozone gas or ozone water produced using the electrode for electrolysis of the present invention has the necessary characteristics, and is expected to be widely used as washing water or for sterilizing, etc.

The electrode substance in the present invention is an electrode substance having an electrically conductive diamond structure and the typical material is a diamond. However, since a diamond is not usually electrically conductive, at, before, or after attaching a diamond to a base material, boron, phosphorus, graphite, etc., which is an impurity for imparting an electric conductivity, is added thereto. In the case of adding graphite, it is unnecessary to add graphite alone. Namely, when obtaining a diamond by a CVD method, by controlling the amount of hydrogen, which is an atmospheric (reactor) gas, slightly changing the temperature, etc., a slight amount of graphite can co-exist in the diamond thus formed.

Also, the electrode substance having an electrically conductive diamond structure can be constituted by a composite material of a diamond and amorphous silicon oxide which is an electrically conductive material in addition to incorporating the foregoing impurity in a diamond.

Furthermore, the electrode substance having an electrically conductive diamond structure is not limited to a diamond itself. Silicon carbide, titanium carbide and/or tungsten carbide each having the same or similar crystal structure as a diamond can be used as the electrode substance having an electrically conductive diamond structure.

There is no particular restriction on the material of the electrode base material and a valve metal such as titanium, niobium, tantalum, etc., can be used. However, when electrolyzing an electrolytic solution containing corrosive component(s), the use of niobium or tantalum having excellent corrosion resistance is desirable although these materials are expensive as compared with titanium.

In another embodiment, the present invention is directed to an electrode for electrolysis comprising an electrode base material, an interlayer containing a material having an electrically conductive diamond structure which covers the surface of said base material, and a platinum group metal and/or the oxide thereof covering the surface of said interlayer.

When using an electrode having no such interlayer, oxygen gas formed at the surface of the electrode substance and an electrolytic solution permeate into the base material to corrode the base material or release the foregoing electrode substance. However, when an interlayer containing a material having an electrically conductive diamond structure is formed between the base material and the electrode substance, the interlayer prevents the oxygen gas and the electrolytic solution from permeating into the base material. Because the base material does not contact the electrolytic solution and the product gas, when the electrode is used for electrolysis in a corrosive atmosphere, the electrode shows sufficient corrosive resistance and stable electrolytic operation can be continued for a long period of time.

Furthermore, when the electrolysis is carried out under a high current density, the generation ratio of the product gas is increased and even in this case, permeation of oxygen, etc., can be almost completely prevented by the foregoing interlayer. The interlayer also protects the base material metal and prevents the release of the electrode substance.

In yet another embodiment, the present invention is directed to an electrode for electrolysis comprising a base material made of a valve metal, an interlayer containing a carbide of a valve metal and/or silicon carbide covering said electrode base material, and an electrode substance having an electrically conductive diamond structure covering the surface of said interlayer. The electrode for electrolysis having such an interlayer is useful when the electrolytic solution is corrosive. That is, the foregoing electrode substance is gradually consumed by electrolysis over a long period of time, and the interlayer prevents the electrolytic solution from contacting the base material to dissolve said base material.

In yet another embodiment, the present invention is directed to an electrolytic cell having two chambers including an anode chamber and a cathode chamber partitioned with an ion-exchange membrane. At least one of an anode placed in the anode chamber and a cathode placed in the cathode chamber is an electrode comprising an electrode base material and an electrode substance having an electrically conductive diamond structure covering the surface of said electrode base material.

The electrolytic cell is suitably used for producing acidic water and alkaline water. Because at least one of the anode and the cathode incorporated into the electrolytic cell comprises an electrode substance having an electrically conductive diamond structure as described above, the electrolytic operation can be continued for a long period of time. Also, an electrolytic solution and product gas free from impurities due to dissolution of the electrode substance can be obtained.

Also, the electrode of the present invention may be incorporated into a three-chamber-type electrolytic cell having an anode chamber, an intermediate chamber, and a cathode chamber.

Also, by incorporating an electrode having the interlayer described above as the anode and/or the cathode, an electrolytic cell can be constructed which is particularly effective for the electrolysis of an electrolytic solution containing corrosive components.

While the invention has been described in detail and with reference to specific embodiments thereof, it will be apparent to one skilled in the art that various changes and modifications can be made therein without departing from the spirit and scope thereof.

What is claimed is:

1. An electrode for electrolysis comprising an electrode base material and an electrode substance having an electrically conductive diamond structure covering the surface of said electrode base material, wherein the electrode substance having an electrically conductive diamond structure comprises a composite of a diamond and an electrically conductive material.

2. The electrode for electrolysis as in claim 1, wherein the electrode substance having an electrically conductive diamond structure comprises a diamond containing at least one of boron, phosphorus and graphite.

3. The electrode for electrolysis as in claim 1, wherein the electrically conductive material comprises amorphous silicon oxide.

4. The electrode for electrolysis as in claim 1, wherein the electrode substance having an electrically conductive diamond structure comprises at least one of silicon carbide, titanium carbide and tungsten carbide.

5. The electrode for electrolysis as in claim 1, wherein the electrode base material comprises carbon or a valve metal selected from the group consisting of titanium, niobium and tantalum.

6. The electrode for electrolysis as in claim 1, which further comprises an interlayer comprising at least one of the carbide of a valve metal and silicon carbide, wherein said interlayer is disposed between the electrode base material and the electrode substance having an electrically conductive diamond structure.

7. The electrode for electrolysis as in claim 1, wherein the electrode substance having an electrically conductive diamond structure is further covered with an electrode substance comprising at least one of a platinum-group metal and oxides thereof.

8. The electrode for electrolysis as in claim 1, wherein the electrode substance having an electrically conductive diamond structure comprises titanium carbide and has a thickness of from 10 to 20 $\mu$m.

9. The electrode for electrolysis as in claim 1, wherein the electrode substance having an electrically conductive diamond structure comprises silicon carbide and has a thickness of from about 50 to 200 $\mu$m.

10. The electrode for electrolysis as in claim 1, wherein the electrode base material is in a form of a wire gauze, a sintered powder or sintered metal fibers.

* * * * *